(12) United States Patent
Jones (10) Patent No.: US 10,970,823 B2
(45) Date of Patent: Apr. 6, 2021

(54) SYSTEM AND METHOD FOR DETECTING MOTION ANOMALIES IN VIDEO

(71) Applicant: Mitsubishi Electric Research Laboratories, Inc., Cambridge, MA (US)

(72) Inventor: Michael Jones, Belmont, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 297 days.

(21) Appl. No.: 16/028,452

(22) Filed: Jul. 6, 2018

(65) Prior Publication Data

US 2020/0013148 A1 Jan. 9, 2020

(51) Int. Cl.
| | |
|---|---|
| *G06K 9/00* | (2006.01) |
| *G06K 9/62* | (2006.01) |
| *G06K 9/46* | (2006.01) |
| *G06K 9/40* | (2006.01) |
| *G06T 5/00* | (2006.01) |
| *G06T 7/00* | (2017.01) |

(52) U.S. Cl.
CPC ............ *G06T 5/003* (2013.01); *G06T 7/0002* (2013.01); *G06T 2207/10016* (2013.01); *G06T 2207/20081* (2013.01); *G06T 2207/20201* (2013.01)

(58) Field of Classification Search
USPC .................. 382/255, 103, 159, 190
See application file for complete search history.

(56) References Cited

U.S. PATENT DOCUMENTS

2006/0109341 A1* 5/2006 Evans ................ G08B 21/0423
348/14.08
2017/0103264 A1* 4/2017 Javan Roshtkhari ........................
G06K 9/6215

OTHER PUBLICATIONS

Patil et al, "Video Anomaly Detection and Localization using 3D SL-HOF Descriptor" 2017 IEEE, pp. 1-6 (Year: 2017).*
Patil et al "Location Aware Hierarchical Cell-Based Anomaly Detection and Categorization in Crowded Scenes", 2017 IEEE, pp. 1-6 (Year: 2017).*

(Continued)

*Primary Examiner* — Kathleen Y Dulaney
(74) *Attorney, Agent, or Firm* — Gennadiy Vinokur; Hironori Tsukamoto (57) ABSTRACT

A system for video anomaly detection partitions the input video into a set of input spatio-temporal regions according to parameters of the spatio-temporal regions of the training video indicative of a number of regions in each video frame defining a spatial dimension of each of the spatio-temporal regions and a number of video frames defining a temporal dimension of each of the spatio-temporal regions, and determines blurred, thresholded difference images for each of the input spatio-temporal regions to produce a set of blurred, thresholded difference images. Next, the system extracts a feature vector from each set of blurred, thresholded difference images to produce a set of input feature vectors, computes a smallest distance between each input feature vector and the training feature vectors corresponding to the same spatial region in the scene to produce a set of distances, and compares each distance from the set of distances with an anomaly detection threshold to detect anomalies in the input video of the scene.

15 Claims, 6 Drawing Sheets

(56) References Cited

OTHER PUBLICATIONS

Li et al, "Multi-scale analysis of COntextual Information Within SPatio-Temporal Video Volumes for Anomaly Detection", 2014 IEEE (Year: 2014).*

Patil et al Global abnormal events detection in crowded scenes using context location and motion rich spatio-temporal volumes, IET Image Process 2019, vol. 12, Iss4, pp. 596-604 (Year: 2018).*

Lu et al., "Abnormal Event Detection at 150 FPS in MATLAB." 2013 IEEE International Conference on Computer Vision, Dec. 1-8, 2013. Sydney, NSW, Australia.

Hasan et al., "Learning Temporal Regularity in Video Sequences." Computer Vision and Pattern Recognition (cs.CV) CVPR 2016. Apr. 15, 2016. arXiv:1604.04574 [cs.CV].

Kratz et al., "Anomaly detection in extremely crowded scenes using spatio-temporal motion pattern models." 2009 IEEE Conference on Computer Vision and Pattern Recognition. Jun. 20-25, 2009. Miami, FL, USA.

Tan et al. "Fast Anomaly Detection in Traffic Surveillance Video Based on Robust Sparse Optical Flow," 2016 IEEE International Conference on Acoustics, Speech and Signal Processing, IEEE, Mar. 20, 2016. pp. 1976-1980.

* cited by examiner

SYSTEM AND METHOD FOR DETECTING MOTION ANOMALIES IN VIDEO

TECHNICAL FIELD

This invention relates generally to computer vision and more particularly to detecting motion anomalies in video.

BACKGROUND

Closed circuit television (CCTV) is widely used for security, transport and other purposes. Example applications include the observation of crime or vandalism in public open spaces or buildings (such as hospitals and schools), intrusion into prohibited areas, monitoring the free flow of road traffic, detection of traffic incidents and queues, detection of vehicles travelling the wrong way on one-way roads.

The monitoring of CCTV displays (by human operators) is a very laborious task however and there is considerable risk that events of interest may go unnoticed. This is especially true when operators are required to monitor a number of CCTV camera outputs simultaneously. As a result, in many CCTV installations, video data is recorded and only inspected in detail if an event is known to have taken place. Even in these cases, the volume of recorded data may be large and the manual inspection of the data may be laborious. Consequently, there is a need for automatic devices to process video images to detect when there is an event of interest. Such a detection is referred herein as a video anomaly detection and can be used to draw the event to the immediate attention of an operator, to place an index mark in recorded video and/or to trigger selective recording of CCTV data.

The problem of video anomaly detection is to automatically detect activity in part of a video that is very different from activities seen in normal (training) video of the same scene. For example, the video may be of a street scene with people walking along a sidewalk. Anomalous activity to be detected might be people fighting or climbing over a fence.

There have been various approaches to the video anomaly detection problem published in the computer vision literature. One class of approaches typified by the paper, "Learning Temporal Regularity in Video Sequences" by Hasan et al. (CVPR 2016) uses a convolutional neural network auto-encoder to learn the typical appearances and motions that occur in the training video. The autoencoder learns to reconstruct typical windows of the training video. To detect anomalies, the autoencoder is used to reconstruct windows of the testing video. Frames with high reconstruction error are flagged as anomalous. The main drawback of this method is that rare but normal activity that occurs in the training video is not well modeled which results in lots of false positive anomaly detections in testing videos.

Another class of approaches is typified by the paper, "Abnormal Event Detection at 150 FPS in MATLAB", by C. Lu et al. (ICCV 2013) is based on reconstructing a feature vector computed from part of an input video from feature vectors of the training video. However, this class of approaches is error-prone and computationally expensive and also can miss rare but normal activity that occurs in the training video.

A third class of approaches to video anomaly detection models the probability distribution of features of the video. "Anomaly Detection in Extremely Crowded Scenes Using Spatio-Temporal Motion Pattern Models" by Kratz and Nishino (CVPR 2009) is an example of this approach. However, this approach can also miss the rare but normal activity that occurs in the training video.

Accordingly, there is still a need for a system and a method for detecting motion anomalies in the input video.

SUMMARY

A typical scene that is of interest for surveillance can include virtually unlimited number of motion variations that is considered normal for that scene. To that end, it can be impractical to compare the acquired video of the scene with all possible variation of the normal motion of the scene to detect anomalies in the video. A number of anomaly detection methods consider this not as a problem but as a fact of life. To that end, various anomaly detection methods aim to come up with an aggregation of the normal motion in the scene and use that aggregation in the anomaly detection. The aggregation can have different forms, such as parameters of a neural network, motion reconstruction techniques or probability distributions. However, the computation of the motion aggregation can be expensive, the motion aggregation can fail to recognize rare but normal motion in the scene, or both.

It is an object of some embodiments to use direct comparison between the motion in the input video and the motion in the training video for anomaly detection. Such a direct comparison, e.g., the comparison based on Euclidean distance, is computationally efficient and can consider even rare normal motions. For example, if usual normal motion on the street is walking, the motion aggregation based method can distinguish the walking from falling. However, if the normal motion includes a motion of a person tying her shoelaces, the aggregation-based methods would consider that motion as an anomaly even if the motion of tying shoes is occasionally present in the training video. In contrast, the direct distance computation methods can recognize this tying shoes motion as normal, if such type of motion is present in the training video.

Some embodiments are based on the recognition that the aggregation techniques of video anomaly detection are post-processing techniques, i.e., the techniques that are used after the motions in the training video are computed. Some embodiments are based on the realization that those post-processing techniques can be replaced with pre-processing techniques used to determine the motions in the first place. Specifically, some embodiments are based on realization that the aggregation problem in video anomaly detection can be addressed when instead of providing an aggregation of the motions computed from the training video, the computation of the motions themselves is performed to reduce a search space for the computed motions while preserving the accuracy and advantages of the direct comparison.

Specifically, some embodiments are based on the realization that such a search-space efficient motion computation can be accomplished via the blurred, thresholded difference of two consecutive frames in the training and the input video. For example, the thresholded difference image of two consecutive video frames capture the motion in those frames. Any pixel that changes significantly (i.e. for which the absolute value of the difference is above a threshold) is assigned a value one in the thresholded difference image and a value zero otherwise. In the blurred, thresholded difference image, this motion image is blurred, e.g., by convolving the thresholded difference image with a Gaussian kernel. Some embodiments are based on realization that if two thresholded difference images capture similar but different motions, then this difference results in two different thresholded difference images. However, when two blurred, thresholded difference images are determined for the same similar but different motions, the blurring can smooth out the difference such that these two blurred thresholded difference images can be considered similar.

This realization allows for a compact and efficient method of storing all of the normal motions that are present in the training video of the scene. The training video is divided into different spatio-temporal regions. For example, in some implementations, a spatio-temporal region of the video is represented by a fixed-length sequence of T blurred, thresholded difference images within the spatial region computed over T+1 consecutive frames of the training video. The sequence of T blurred, thresholded difference images within a spatial region are stacked together and vectorized to yield a feature vector.

For a training video, a number of feature vectors can be very similar due partly to the blurring operation. Two feature vectors are considered duplicates of each other if the distance between them is less than a threshold, referred herein as a duplication threshold. In such a manner, when only unique feature vectors in each spatial region of the training video are stored, the search space of the motion is reduced making that search space practical for direct motion comparison.

Accordingly, one embodiment discloses a system for video anomaly detection that includes a memory to store a set of training feature vectors extracted from blurred, thresholded difference images of spatio-temporal regions of a training video of the scene and a processor to accept an input video of a scene through an input interface and to detect an anomaly in the input video of the scene based on comparison of the input video with the training video, i.e., comparison with the training feature vectors stored in the memory.

Specifically, the processor is configured to partition the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions; determine sequences of blurred, thresholded difference images for each of the input spatio-temporal regions to produce a set of input feature vectors; compute a distance between each input feature vector and each of the training feature vectors corresponding to the same spatial region in the scene to produce a set of distances; and compare each distance from the set of distances with an anomaly detection threshold to detect an anomaly in the input video of the scene.

For example, the processor can detect the anomaly in the input video of the scene when at least one distance in the set of distances is greater than the anomaly detection threshold. In some implementations, the processor executes a control action in response to detecting the anomaly. For example, the control action can draw the event to the immediate attention of an operator, place an index mark in recorded video, trigger selective recording of CCTV data, and/or cause an execution of a security application.

Some embodiments are based on recognition that when the blurred, thresholded difference images are determined to reduce a search space of anomaly detection, a special need arise for selecting parameters of blurring and/or for identifying duplicates of the feature vectors. For example, some embodiments are based on realization that there is a need to determine a minimum distance between the training feature vectors stored in the memory and corresponding to the same spatial region. Such a minimum distance is referred herein as a distance threshold.

The distance threshold allows reducing a number of training feature vectors stored in the memory, while preserving accuracy of anomaly detection. Some embodiments are based on realization that the values of the distance threshold can depend on the value of the anomaly detection threshold used for direct comparison between the input and training feature vector. To that end, in some embodiments the distance threshold is a function of the anomaly detection threshold.

For example, in some embodiments the distance threshold is proportional to the anomaly detection threshold according to a coefficient of proportionality. For example, in some implementations, the distance threshold is equal to or greater than the anomaly detection threshold, i.e., the coefficient of proportionality is equal to or greater than one. This embodiment can advantageously balance the accuracy of the anomaly detection with its speed, because larger values of the coefficient of proportionality reduce the memory requirement to store the training feature vectors, increase the speed of comparison, but decrease the accuracy of anomaly detection. In some embodiments, the coefficient of proportionality is between one and two inclusively to reduce the negative effect of the search space reduction on the accuracy of the anomaly detection.

Additionally, or alternatively, in one embodiment, the distance threshold is greater than a median distance of the training feature vectors stored in the memory and corresponding to the same spatial region. For example, some implementations calculate a mean of distances between each training feature vector and all other training feature vectors in the same spatial region and increase the mean by a standard deviation to produce the distance threshold. For example, one embodiment calculates the mean distance, m, and the standard deviation, s, and determines the distance threshold $T_2$ as $T_2=m+c*s$ where c is a positive constant, e.g., one, two or three. These embodiments take advantage of using the mean and standard deviation, which is better justified by statistics.

Additionally, or alternatively, in some embodiments, the value of the blur kernel is inversely proportional to the distance threshold. In other words, the more blur is used the smaller the distance threshold is, because more blur makes video patches more similar. For example, in some implementations, the distance threshold $T_1$ is inversely proportional to the blur kernel according to $T1=c/n$, where c is a constant, i.e., the coefficient of the inverse proportionality, and n is the length in pixels of the square blur kernel.

Accordingly, one embodiment discloses a system for video anomaly detection, including an input interface to accept an input video of a scene; a memory to store sets of training feature vectors extracted from blurred, thresholded difference images of spatio-temporal regions of a training video of the scene; and a processor configured to partition the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions; determine blurred, thresholded difference images for each of the input spatio-temporal regions to produce a set of blurred, thresholded difference images; extract a feature vector from each set of blurred, thresholded difference images to produce a set of input feature vectors; compute a smallest distance between each input feature vector and the training feature vectors corresponding to the same spatial region in the scene to produce a set of distances; and compare each distance from the set of distances with an anomaly detection threshold to detect anomalies in the input video of the scene.

Another embodiment discloses a method for video anomaly detection, wherein the method uses a processor coupled to a memory storing sets of training feature vectors extracted from blurred, thresholded difference images of spatio-temporal regions of a training video of the scene, wherein the processor is coupled with stored instructions implementing the method, wherein the instructions, when executed by the processor carry out at least some steps of the method. The method includes accepting an input video of a scene; partitioning the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions; determining blurred, thresholded difference images for each of the input spatio-temporal regions to produce a set of blurred, thresholded difference images; extracting a feature vector from each set of blurred, thresholded difference images to produce a set of input feature vectors; computing a smallest distance between each input feature vector and the training feature vectors corresponding to the same spatial region in the scene to produce a set of distances; and comparing each distance from the set of distances with an anomaly detection threshold to detect anomalies in the input video of the scene.

Yet another embodiment discloses a non-transitory computer readable storage medium embodied thereon a program executable by a processor for performing a method, the method includes accepting an input video of a scene; partitioning the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions; determining blurred, thresholded difference images for each of the input spatio-temporal regions to produce a set of blurred, thresholded difference images; extracting a feature vector from each set of blurred, thresholded difference images to produce a set of input feature vectors; computing a smallest distance between each input feature vector and training feature vectors corresponding to the same spatial region in the scene to produce a set of distances; and comparing each distance from the set of distances with an anomaly detection threshold to detect anomalies in the input video of the scene.

DETAILED DESCRIPTION

Figure 1:
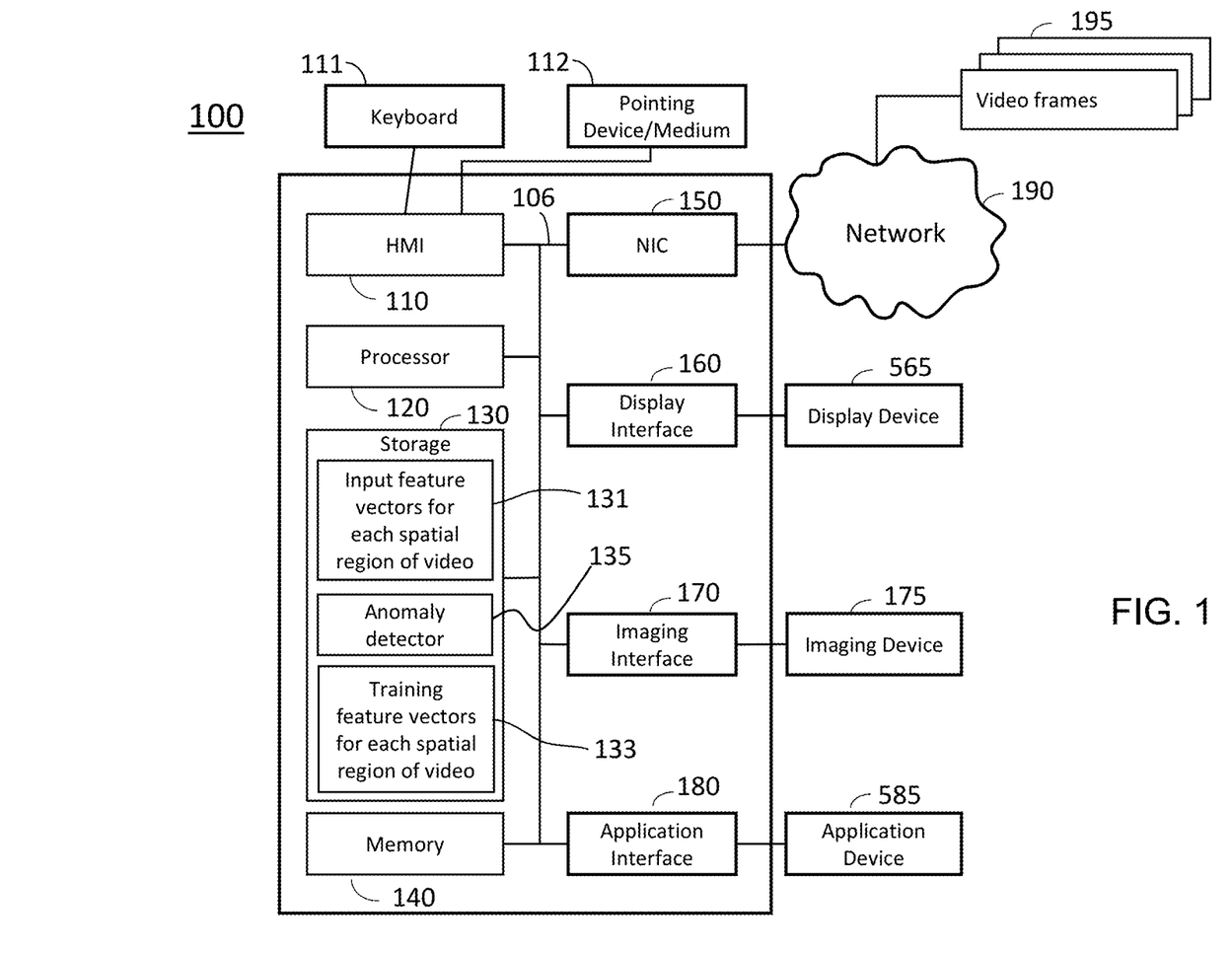
FIG. 1 shows a block diagram of an image processing system for detecting anomalies in videos in accordance with some embodiments.

FIG. 1 shows a block diagram of an image processing system 100 for detecting anomalies in videos in accordance with some embodiments. The image processing system 100 includes a processor 120 configured to execute stored instructions, as well as a memory 140 that stores instructions that are executable by the processor. The processor 120 can be a single core processor, a multi-core processor, a computing cluster, or any number of other configurations. The memory 140 can include random access memory (RAM), read only memory (ROM), flash memory, or any other suitable memory systems. The processor 120 is connected through a bus 106 to one or more input and output devices. These instructions implement a method for detecting anomalies in a video sequence.

In various embodiments, the anomaly detection produces a set of bounding boxes indicating the locations and sizes of any anomalies in each video frame. The image processing system 100 is configured to detect anomalies in a video using an anomaly detector 135 that compares feature vectors 131 of spatio-temporal regions of the input video of a scene to feature vectors 133 from spatio-temporal regions of the training video of the same scene. For example, a storage device 130 can be adapted to store the sets of feature vectors computed from different spatial regions of training and/or input video frames. The storage device 130 can be implemented using a hard drive, an optical drive, a thumb drive, an array of drives, or any combinations thereof.

Features, as used herein, are information or values extracted from the video or frames of the video. In some implementations, the features are the function of intensities of the frames of the video. A feature vector is a data structure storing the features, e.g., intensities. The feature vector can be one or multi-dimensional. For example, in some embodiments, the feature vector stores intensities of blurred, thresholded difference images produced from the input and the training videos.

Various embodiments can use different spatio-temporal partitions of the video of the scene. However, in various implementations, the spatio-temporal partitions of the input video are identical to the spatio-temporal partitions of the training video to streamline the comparison.

In some implementations, a human machine interface 110 within the image processing system 100 connects the system to a keyboard 111 and pointing device 112, wherein the pointing device 112 can include a mouse, trackball, touchpad, joy stick, pointing stick, stylus, or touchscreen, among others. The image processing system 100 can be linked through the bus 106 to a display interface 160 adapted to connect the image processing system 100 to a display device 565, wherein the display device 565 can include a computer monitor, camera, television, projector, or mobile device, among others.

The image processing system 100 can also be connected to an imaging interface 170 adapted to connect the system to an imaging device 175. In one embodiment, the frames of input video on which the anomaly detector is run are received from the imaging device. The imaging device 175 can include a video camera, computer, mobile device, webcam, or any combination thereof.

A network interface controller 150 is adapted to connect the image processing system 100 through the bus 106 to a network 190. Through the network 190, the video frames 195, e.g., frames of the training and/or video can be downloaded and stored within the computer's storage system 130 for storage and/or further processing.

In some embodiments, the image processing system 100 is connected to an application interface 180 through the bus 106 adapted to connect the image processing system 100 to an application device 585 that can operate based on results of anomaly detection. For example, the device 585 is a surveillance system that uses the locations of detected anomalies to alert a security guard to investigate further.

Figure 2A:
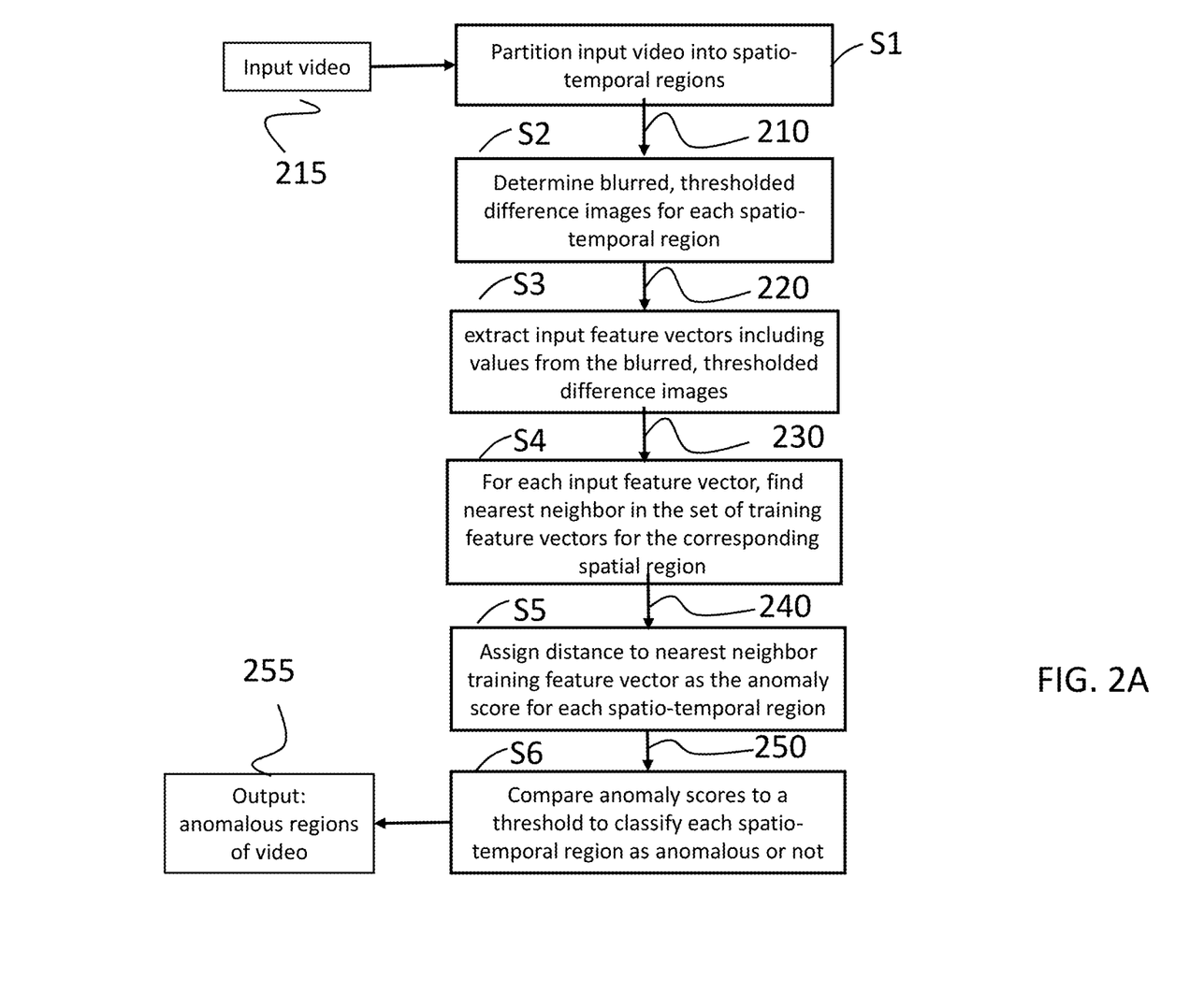
FIG. 2A shows a flowchart of a method for detecting anomalies in frames of a video according to some embodiments.

FIG. 2A shows a flowchart of a method for detecting anomalies in frames of a video according to some embodiments. In step S1, the input video 215 is partitioned into spatio-temporal regions 210. Each spatio-temporal region can be defined by a bounding box in a video frame defining the spatial extent and a fixed number of frames, defining the temporal extent. Different spatio-temporal regions may be overlapping. The union of all spatio-temporal regions cover the entire video sequence. In step S2, blurred, thresholded difference images 220 are computed for each spatio-temporal region. In step S3, feature vectors 230 are created from the blurred, thresholded difference images. For example, one embodiment simply concatenates all pixels values into a single vector. In step S4, the distance of each feature vector is computed to a set of training feature vectors computed for the same spatial region from training video of normal activity from the same camera as the testing video to find the minimum distance 240, i.e., the distance to its nearest neighbor. In step S5, the minimum distance is assigned as the anomaly score 250 for this spatio-temporal region of the input video.

In step S6, each anomaly score is compared to a threshold and if the score is above a threshold then the spatio-temporal region is classified as anomalous. Otherwise the region is classified as normal. For example, one embodiment is configured to detect the anomaly in the input video of the scene when at least one distance in the set of distances is greater than the anomaly detection threshold; and execute a control action in response to detecting the anomaly. The steps of the method are performed for each of the different spatio-temporal region 210.

Figure 2B:
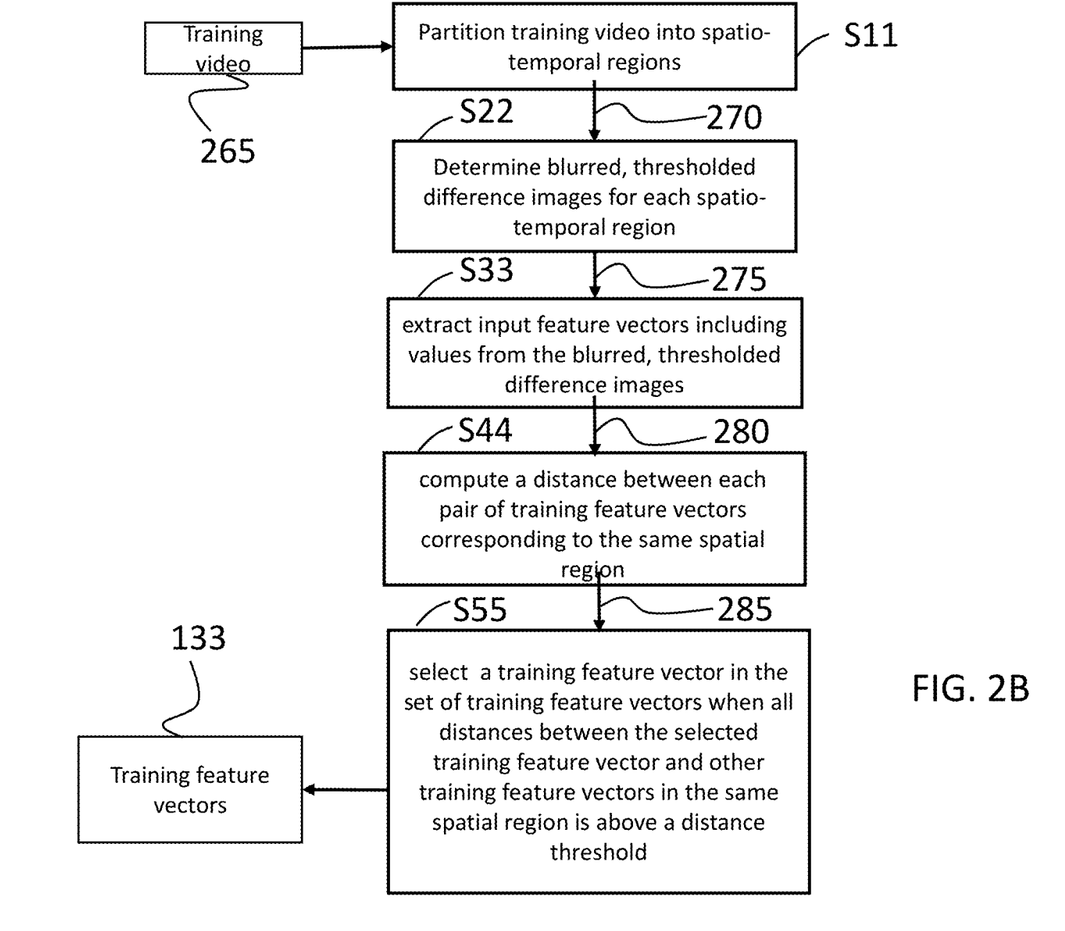
FIG. 2B shows a flow chart of a method of preparing sets of training feature vectors extracted from blurred, thresholded difference images of spatio-temporal regions of a training video of the scene according to one embodiment.

FIG. 2B shows a flow chart of a method of preparing sets of training feature vectors extracted from blurred, thresholded difference images of spatio-temporal regions of a training video of the scene according to one embodiment. The training feature vectors are considered to represent a normal behavior in the scene. In other words, if the input frame is represented by a frame in the training video, the scene in the input frame is considered normal. Otherwise, that scene is considered anomalous.

The training features vectors are determined in a manner similar to determining the input feature vectors. For example, the embodiment is configured to partition S11 the training video 265 into the spatio-temporal regions 270 of the training video. The dimensions of the resolution of the spatio-temporal regions 210 corresponds to the dimensions and/or resolutions of the spatio-temporal regions 270. Next, the embodiment determines S22 blurred difference images for each of the training spatio-temporal regions 270 to produce a set of training blurred difference images 275 and extracts S33 features from each blurred difference image in the set of training blurred difference images to produce training feature vectors 280.

The embodiment is configured to compute S44 a distance between each training feature vector corresponding to the same spatial region in the scene to produce a set of distances 285 between training feature vectors. Next, the embodiment prunes similar training feature vector to reduce the computational burden of the comparison. Specifically, the embodiment selects S55 a training feature vector in the set training feature vectors when all distances between the selected training feature vector and corresponding feature vectors in the set of training feature vectors is above a distance threshold defining a minimum distance between the training feature vectors stored in the memory and corresponding to the same spatial region.

In some embodiments, to save the memory space and improve the comparisons, the minimum distance between the training feature vectors stored in the memory and corresponding to the same spatial region is a function of the anomaly detection threshold. In such a manner, those thresholds are jointly used to improve the anomaly detection. For example, in one implementation, a minimum distance between the training feature vectors stored in the memory and corresponding to the same spatial region is equal to or greater than the anomaly detection threshold.

Additionally, or alternatively, some embodiments consider only information from the training video itself to determine a minimum distance between the training feature vectors stored in the memory and corresponding to the same spatial region. For example, in one implementations the minimum distance is greater than a median distance of the training feature vectors stored in the memory and corresponding to the same spatial region. This embodiment provides data-driven approach for determining the minimum distance. In addition, in some implementations the anomaly detection threshold is determined as a function of the minimum distance determined by the data-driven approach. In such a manner, both minimum distance and the anomaly detection threshold are automatically adapted for different scenes.

In such a manner, some embodiments to use direct comparison between the motion in the input video and the motion in the training video for anomaly detection. Such a direct comparison, e.g., the comparison based on Euclidean distance, is computationally efficient and can consider even rare normal motions. For example, if usual normal motion on the street is walking, the motion aggregation based method can distinguish the walking from falling. However, if the normal motion includes a motion of a person tying her shoelaces, the aggregation-based methods would consider that motion as an anomaly even if the motion of tying shoes is occasionally present in the training video. In contrast, the direct distance computation methods can recognize this tying shoes motion as normal, if such type of motion is present in the training video.

Some embodiments are based on the recognition that the aggregation techniques of video anomaly detection are post-processing techniques, i.e., the techniques that are used after the motions in the training video are computed. Some embodiments are based on the realization that those post-processing techniques can be replaced with pre-processing techniques used to determine the motions in the first place. Specifically, some embodiments are based on realization that the aggregation problem in video anomaly detection can be addressed when instead of providing an aggregation of the motions computed from the training video, the computation of the motions themselves is performed to reduce a search space for the computed motions while preserving the accuracy and advantages of the direct comparison.

Specifically, some embodiments are based on the realization that such a search-space efficient motion computation can be accomplished via the blurred, thresholded difference of two consecutive frames in the training and the input video. For example, the thresholded difference image of two consecutive video frames capture the motion in those frames. Any pixel that changes significantly (i.e. for which the absolute value of the difference is above a threshold) is assigned a value one in the thresholded difference image and a value zero otherwise. In the blurred, thresholded difference image, this motion image is blurred, e.g., by convolving the thresholded difference image with a Gaussian kernel. Some embodiments are based on realization that if two thresholded difference images capture similar but different motions, then this difference results in two different thresholded difference images. However, when two blurred, thresholded difference images are determined for the same similar but different motions, the blurring can smooth out the difference such that these two blurred thresholded difference images can be considered similar.

Figure 3:
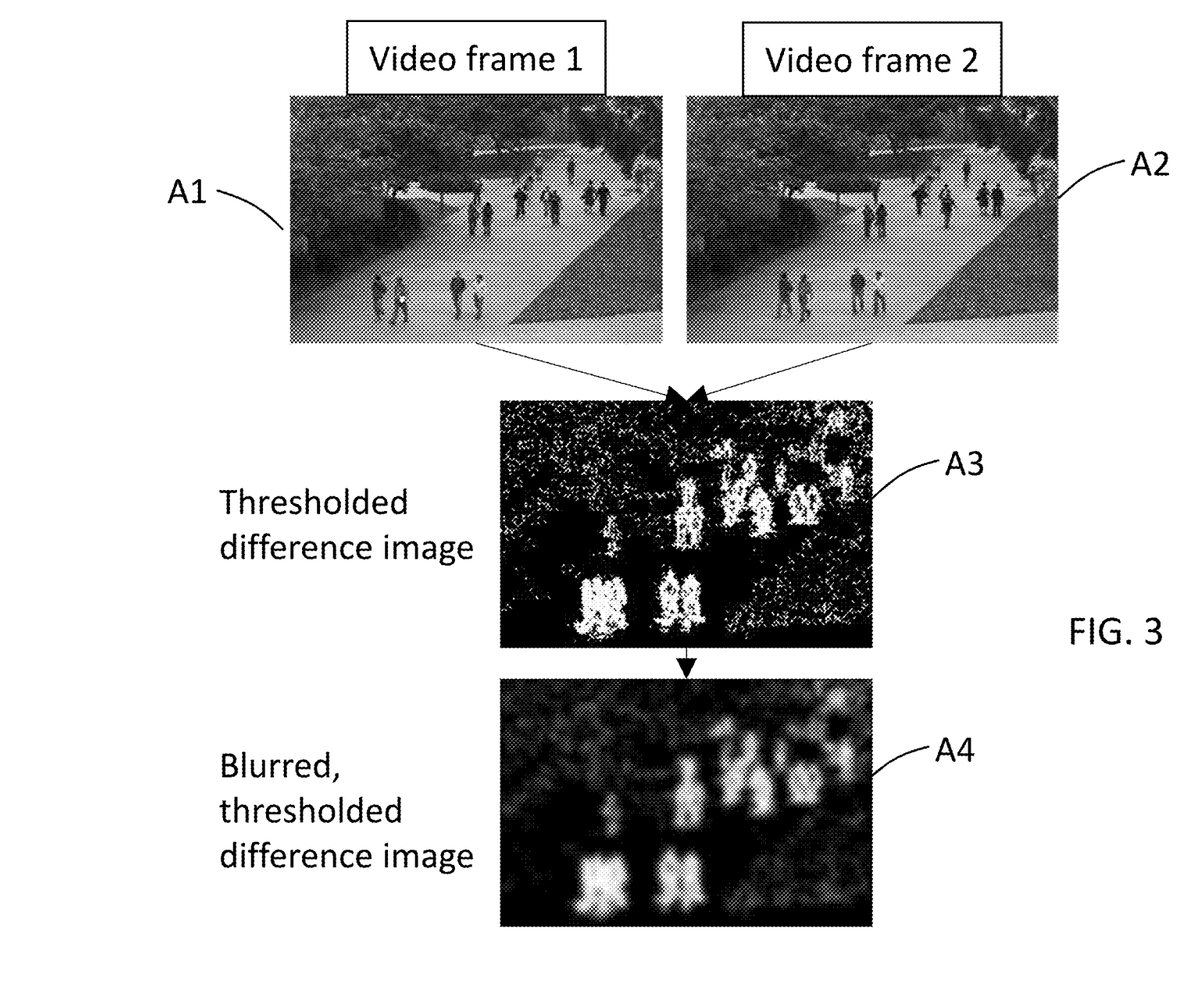
FIG. 3 shows a schematic of determining a blurred, thresholded difference image used by some embodiments to reduce the search space.

FIG. 3 shows a schematic of determining a blurred, thresholded difference image used by some embodiments to reduce the search space. Given two video frames (A1 and A2), pixels in A1 are subtracted from pixels at the same location in A2 and the absolute value of each difference is computed. If the absolute value of the difference is greater than a threshold then the pixel of the thresholded difference image, A3, at that location is assigned the value 1, otherwise the pixel is assigned the value 0. Next, the thresholded difference image is blurred, for example using a Gaussian filter, to create a blurred, thresholded difference image (A4).

Some embodiments are based on recognition that when the blurred, thresholded difference images are determined to reduce a search space of anomaly detection, a special need arises for selecting parameters of blurring and/or for identifying duplicates of the feature vectors. For example, some embodiments are based on realization that there is a need to determine a minimum distance between the training feature vectors stored in the memory and corresponding to the same spatial region. Such a minimum distance is referred herein as a distance threshold.

The distance threshold allows reducing a number of training feature vectors stored in the memory, while preserving accuracy of anomaly detection. Some embodiments are based on realization that the values of the distance threshold can depend on the value of the anomaly detection threshold used for direct comparison between the input and training feature vector. To that end, in some embodiments the distance threshold is a function of the anomaly detection threshold.

For example, in some embodiments the distance threshold is proportional to the anomaly detection threshold according to a coefficient of proportionality. For example, in some implementations, the distance threshold is equal to or greater than the anomaly detection threshold, i.e., the coefficient of proportionality is equal to or greater than one. This embodiment can advantageously balance the accuracy of the anomaly detection with its speed, because larger values of the coefficient of proportionality reduce the memory requirement to store the training feature vectors, increase the speed of comparison, but decrease the accuracy of anomaly detection. In some embodiments, the coefficient of proportionality is between one and two inclusively to reduce the negative effect of the search space reduction on the accuracy of the anomaly detection.

Additionally, or alternatively, in one embodiment, the distance threshold is greater than a median distance of the training feature vectors stored in the memory and corresponding to the same spatial region. For example, some implementations calculate a mean of distances between each training feature vector and all other training feature vectors in the same spatial region and increase the mean by a standard deviation to produce the distance threshold. For example, one embodiment calculates the mean distance, m, and the standard deviation, s, and determines the distance threshold $T_2$ as $T_2=m+c*s$ where c is a positive constant, e.g., one, two or three. These embodiments take advantage of using the mean and standard deviation, which is better justified by statistics.

Figure 4:
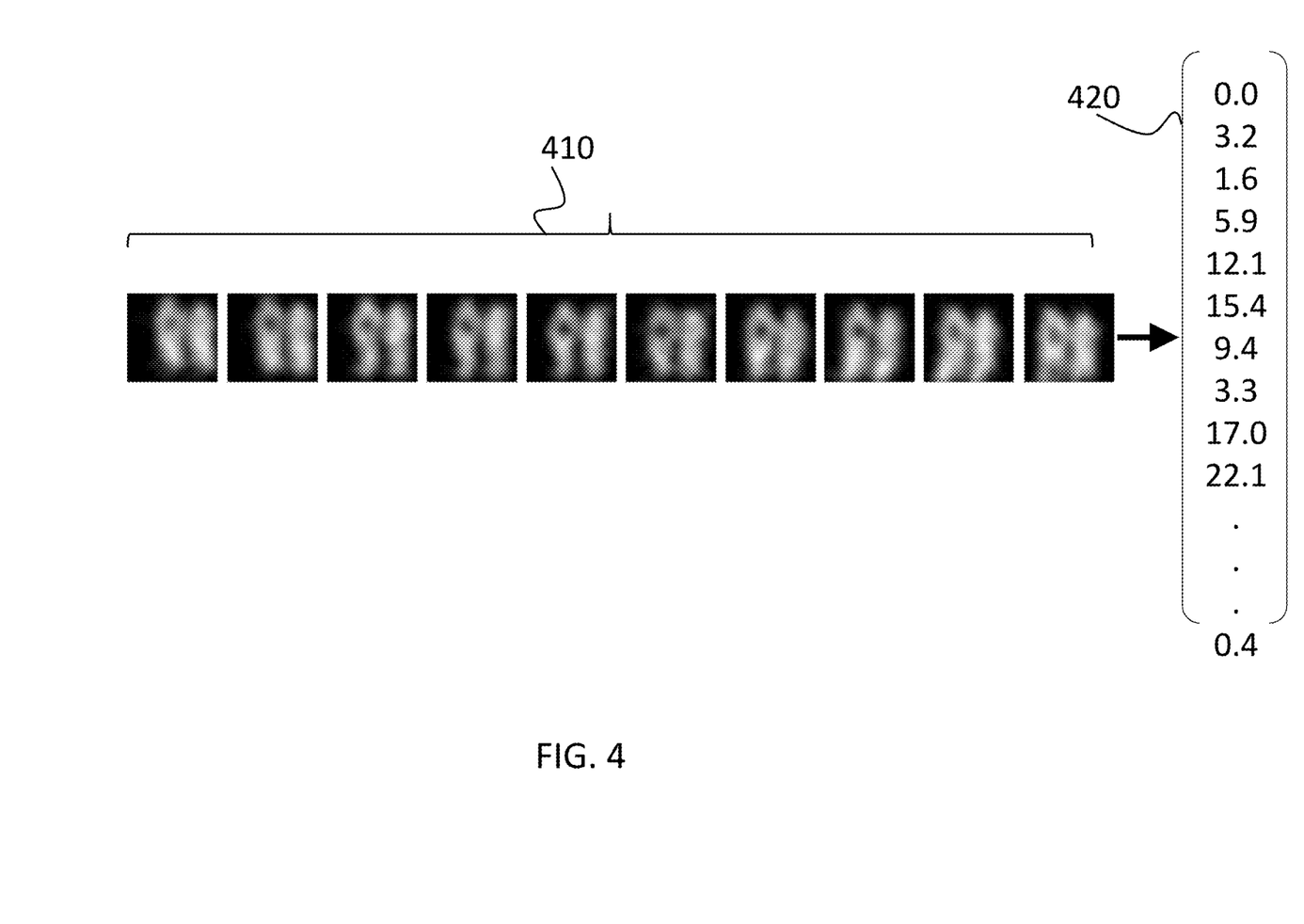
FIG. 4 shows a schematic of creating a feature vector from a set of blurred, thresholded difference images computed from a spatio-temporal region of video according to one embodiment.

FIG. 4 shows a schematic of creating a feature vector from a set of blurred, thresholded difference images computed from a spatio-temporal region of video according to one embodiment. In this example, blurred, thresholded difference images for 10 frames 410 of a spatio-temporal region are vectorized into a vector 420. For example, the value of each pixel in each blurred thresholded difference image is listed from top, left to bottom, right in each image and copied into a one-dimensional vector 420.

In some embodiments, the value of the blur kernel is inversely proportional to the distance threshold. In other words, the more blur is used the smaller the distance threshold is, because more blur makes video patches more similar. For example, in some implementations, the distance threshold $T_1$ is inversely proportional to the blur kernel according to $T1=c/n$, where c is a constant, i.e., the coefficient of the inverse proportionality, and n is the length in pixels of the square blur kernel.

Figure 5:
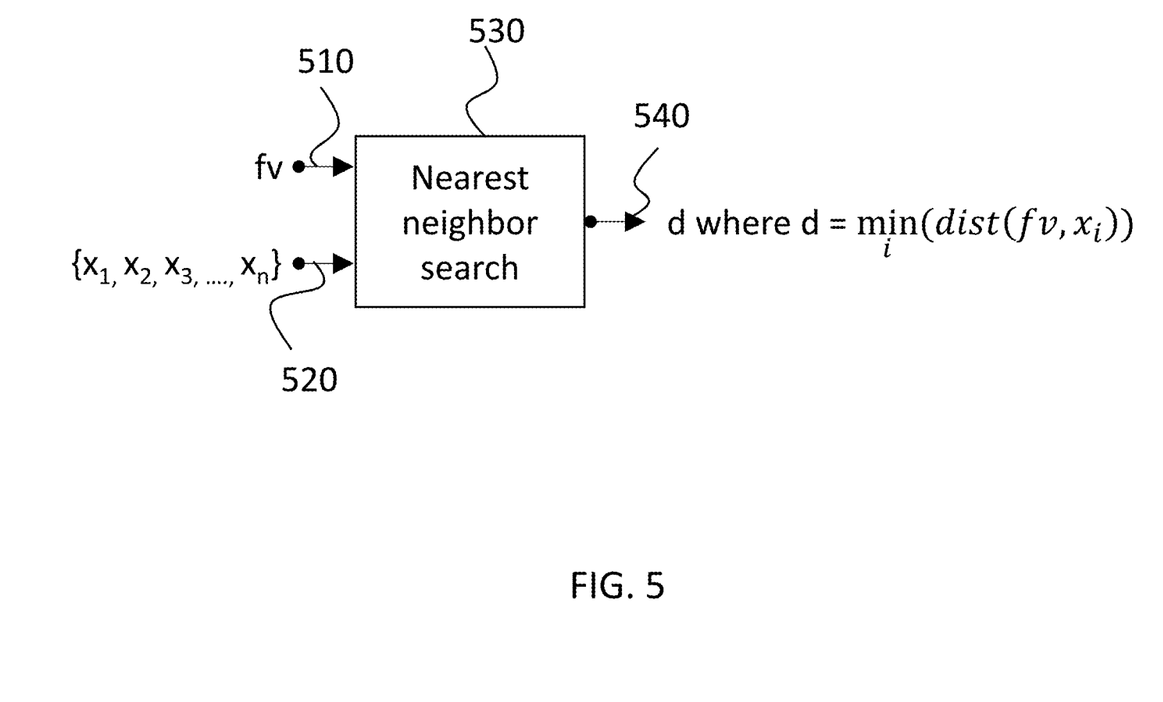
FIG. 5 shows a schematic of a nearest neighbor search method used by some embodiments to find the closest training feature vector to a testing feature vector representing a sequence of blurred, thresholded difference images.

FIG. 5 shows a schematic of a nearest neighbor search method used by some embodiments to find the closest training feature vector to a testing feature vector representing a sequence of blurred, thresholded difference images. In FIG. 5, fv 510 is the input feature vector and each $x_i$ 520 is a training feature vector. The nearest neighbor search 530 outputs the minimum distance, d, 540 between fv and the nearest $x_i$. Different embodiments use different nearest neighbor searches. For example, one embodiment uses brute force search to compare each input feature vector with each training feature vector. In some implementations, the nearest neighbor search 530 is an approximate nearest neighbor search, which is not guaranteed to find the minimum distance but may instead find a feature vector that is close to the minimum. Various nearest neighbor search algorithms know in the field could be used such as k-d trees, k-means trees, and locality sensitive hashing.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

The invention claimed is:

1. A system for video anomaly detection, comprising:
an input interface to accept an input video of a scene;
a memory to store sets of training feature vectors extracted from blurred, thresholded difference images of spatio-temporal regions of a training video of the scene; and
a processor configured to
partition the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions;
determine blurred, thresholded difference images for each of the input spatio-temporal regions to produce a set of blurred, thresholded difference images;
extract a feature vector from each set of blurred, thresholded difference images to produce a set of input feature vectors;
compute the minimum distance between each input feature vector and the training feature vectors corresponding to same spatial regions in the scene to produce a set of distances; and
compare each distance from the set of distances with an anomaly detection threshold to detect an anomaly in the input video of the scene.

2. The system of claim 1, wherein the processor is configured to
detect the anomaly in the input video of the scene when at least one distance in the set of distances is greater than the anomaly detection threshold; and
execute a control action in response to detecting the anomaly.

3. The system of claim 1, wherein distances among the training feature vectors stored in the memory for a spatial region are chosen so that the minimum distance among the training feature vectors for the spatial region is a function of the anomaly detection threshold.

4. The system of claim 1, wherein the training feature vectors stored in the memory for a spatial region are chosen so that the minimum distance among the training feature vectors for the spatial region is equal to or greater than the anomaly detection threshold.

5. The system of claim 1, wherein the training feature vectors stored in the memory for a spatial region are chosen so that the minimum distance among the training feature vectors for the spatial region is greater than a median distance between all possible pairs of training feature vectors for the spatial region.

6. The system of claim 1, wherein the processor to determine the training feature vectors is configured to
partition the training video into the spatio-temporal regions of the training video;
determine blurred, thresholded difference images for each of the training spatio-temporal regions to produce a set of training blurred, thresholded difference images;
extract features from each blurred, thresholded difference image in the set of training blurred, thresholded difference images to produce training feature vectors; and
compute a distance between each training feature vector to extracted from the same spatial region in the scene to produce a set of distances; and
select a training feature vector in a set of training feature vectors when all distances between the selected training feature vector and corresponding feature vectors in the set of training feature vectors are above a distance threshold defining a minimum distance among the training feature vectors stored in the memory and corresponding to the same spatial region.

7. The system of claim 6, wherein the processor, for determining the distance threshold, is configured to
calculate a mean of distances between all training feature vectors and the selected training feature vector; and
increase the mean by a standard deviation to produce the distance threshold.

8. The system of claim 1, wherein the processor, to determine a blurred, thresholded difference image, is configured to
determine a difference between subsequent video frames of the input video to produce a difference image;
threshold the difference image to produce a binary difference image; and
blur the binary difference image with a kernel to produce the blurred, thresholded difference image.

9. The system of claim 8, wherein a type of the kernel is a Gaussian kernel.

10. The system of claim 8, wherein a value of the kernel is a function of a distance threshold defining a minimum distance between the training feature vectors stored in the memory and corresponding to the same spatial region.

11. The system of claim 10, wherein the value of the kernel is inversely proportional to the distance threshold.

12. A method for video anomaly detection, wherein the method uses a processor coupled to a memory storing sets of training feature vectors extracted from blurred, thresholded difference images of spatio-temporal regions of a training video of the scene, wherein the processor is coupled with stored instructions implementing the method, wherein the instructions, when executed by the processor carry out at least some steps of the method, comprising:
accepting an input video of a scene;
partitioning the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions;

determining blurred, thresholded difference images for each of the input spatio-temporal regions to produce a set of blurred, thresholded difference images;

extracting a feature vector from each set of blurred, thresholded difference images to produce a set of input feature vectors;

computing a minimum distance between each input feature vector and the training feature vectors corresponding to same spatial regions in the scene to produce a set of distances; and comparing each distance from the set of distances with an anomaly detection threshold to detect an anomaly in the input video of the scene.

13. The method of claim 12, further comprising:

detecting the anomaly in the input video of the scene when at least one distance in the set of distances is greater than the anomaly detection threshold; and executing a control action in response to detecting the anomaly.

14. The method of claim 12, further comprising:

partitioning the training video into the spatio-temporal regions of the training video;

determining blurred difference images for each of the training spatio-temporal regions to produce a set of training blurred difference images;

extracting features from each blurred difference image in the set of training blurred difference images to produce training feature vectors; and computing a distance between each training feature vector extracted from the same spatial region in the scene to produce a set of distances between the extracted training feature vectors;

selecting a training feature vector in a set of training feature vectors when all distances between the selected training feature vector and corresponding feature vectors in the set of training feature vectors are above a distance threshold defining a minimum distance between the training feature vectors stored in the memory and corresponding to the same spatial region; and storing the set of training feature vectors in the memory.

15. A non-transitory computer readable storage medium storing sets of training feature vectors extracted from blurred, thresholded difference images of spatio-temporal regions of a training video of the scene, the medium embodied thereon a program executable by a processor for performing a method, the method comprising:

accepting an input video of a scene;

partitioning the input video into a set of input spatio-temporal regions according to parameters of the spatio-temporal regions of the training video, wherein the parameters are indicative of a number of regions in each video frame defining a spatial dimension of each of the spatio-temporal regions and a number of video frames defining a temporal dimension of each of the spatio-temporal regions;

determining blurred, thresholded difference images for each of the input spatio-temporal regions to produce a set of blurred, thresholded difference images;

extracting a feature vector from each set of blurred, thresholded difference images to produce a set of input feature vectors; and computing a smallest distance between each input feature vector and training feature vectors corresponding to same spatial regions in the scene to produce a set of distances; and comparing each distance from the set of distances with an anomaly detection threshold to detect an anomaly in the input video of the scene.

* * * * *